United States Patent [19]
Kochis et al.

[11] Patent Number: 5,825,617
[45] Date of Patent: Oct. 20, 1998

[54] WORKSLATE COMPUTER HAVING MODULAR DEVICE DOCKING STATIONS ON HORIZONTAL AND VERTICAL SIDE PORTIONS

[75] Inventors: Gary Kochis, Uniontown; Donald Embree, North Canton, both of Ohio; Robert F. Meyerson, Captiva Island, Fla.; Calvin E. Lewis, Cuyahoga Falls, Ohio

[73] Assignee: Teletransactions, Inc., Akron, Ohio

[21] Appl. No.: 516,152

[22] Filed: Aug. 17, 1995

Related U.S. Application Data

[63] Continuation-in-part of Ser. No. 269,190, Jun. 30, 1994, Pat. No. 5,579,487, which is a continuation-in-part of Ser. No. 956,112, Oct. 2, 1992, abandoned.

[51] Int. Cl.⁶ .............................. G06F 1/16; H05K 7/12
[52] U.S. Cl. ....................................... 361/686; 439/928.1
[58] Field of Search ...................... 364/708.1; 439/928.1, 439/929; 345/169, 905; 361/683–686

[56] References Cited

U.S. PATENT DOCUMENTS

| | | |
|---|---|---|
| D. 270,061 | 8/1983 | Ackeret . |
| D. 270,062 | 8/1983 | Ackeret . |
| D. 270,063 | 8/1983 | Ackeret . |
| D. 297,939 | 10/1988 | Bradbury et al. . |
| D. 309,295 | 7/1990 | de la Huerga et al. . |
| D. 314,372 | 2/1991 | Morris . |
| D. 315,549 | 3/1991 | Clough et al. . |
| D. 319,433 | 8/1991 | Pearce . |
| D. 338,656 | 8/1993 | Spayde . |
| D. 345,147 | 3/1994 | Fukutake et al. . |
| D. 346,999 | 5/1994 | Meyerson et al. . |
| D. 348,654 | 7/1994 | Branck et al. . |
| D. 356,299 | 3/1995 | Hamilton et al. . |
| 3,356,836 | 12/1967 | Stenby . |
| 3,876,863 | 4/1975 | Boone . |

(List continued on next page.)

FOREIGN PATENT DOCUMENTS

| | | |
|---|---|---|
| 803268 | 12/1990 | Japan . |
| 91/04461 | 4/1991 | WIPO . |

OTHER PUBLICATIONS

Article published by Symbol Technologies, Inc.–"A Primer for Two Dimensional Bar Codes, Portable Data Files, and PDF 417", dated Oct. 1990 by Stuart Itkin.

Telxon Corp. brochure entitled "PTC–1140 Wireless Pen–Based Computer", dated Jan. 1994.

Telxon Corp. brochure entitled "PTC–1180 WIreless Pen–based Computer Tablet", dated Jan. 1994.

Telxon Corp. brochure entitled "The Wireless Hospital–Time and Cost Saving Solutions for Healthcare Information Networks", Copyright 1994.

Advertisement in *Automatic ID News* for Monarch Marketing Systems, Thermal Transfer Renegade Printer, p. 22, dated Apr. 1994.

(List continued on next page.)

*Primary Examiner*—Michael W. Phillips
*Attorney, Agent, or Firm*—Watts, Hoffman, Fisher & Heinke Co., LPA

[57] ABSTRACT

A hand-held workslate computer is disclosed. The workslate computer includes electronic circuitry including a microprocessor and a visual display screen electrically coupled to the microprocessor. The display screen includes a position sensitive contact portion. The workslate computer also includes a housing including a top face and a bottom face separated by a side wall and defining an interior region, the housing supporting the electronic circuitry and the visual display screen. A set of modular devices is provided, each device including interface circuitry. The housing further includes at least two modular device docking stations adapted to releasably engage a selected one of the set of modular devices. Interface circuitry is provided to electrically couple circuitry in the selected modular device and the microprocessor. The modular devices may be mounted to selected modular device docking stations to provide an ergonomically correct weight balance.

15 Claims, 11 Drawing Sheets

U.S. PATENT DOCUMENTS

| | | |
|---|---|---|
| 4,279,021 | 7/1981 | See et al. . |
| 4,336,530 | 6/1982 | Koike et al. . |
| 4,387,297 | 6/1983 | Swartz et al. . |
| 4,412,751 | 11/1983 | Jeannet et al. . |
| 4,460,120 | 7/1984 | Shepard et al. . |
| 4,523,297 | 6/1985 | Ugon et al. . |
| 4,545,023 | 10/1985 | Mizzi .................................. 361/680 X |
| 4,587,630 | 5/1986 | Straton et al. . |
| 4,593,186 | 6/1986 | Swartz et al. . |
| 4,660,221 | 4/1987 | Diugos . |
| 4,664,101 | 5/1987 | Granberg . |
| 4,686,332 | 8/1987 | Greanias et al. . |
| 4,725,694 | 2/1988 | Auer et al. . |
| 4,758,717 | 7/1988 | Shepard et al. . |
| 4,794,239 | 12/1988 | Allais . |
| 4,835,713 | 5/1989 | Pastor . |
| 4,847,818 | 7/1989 | Olsen . |
| 4,853,807 | 8/1989 | Trager ...................................... 361/686 |
| 4,866,642 | 9/1989 | Obrig et al. . |
| 4,866,646 | 9/1989 | Nakamura ........................... 364/709.11 |
| 4,885,580 | 12/1989 | Noto et al. . |
| 4,889,982 | 12/1989 | Young et al. . |
| 4,916,441 | 4/1990 | Gombrich ............................... 345/169 |
| 4,954,967 | 9/1990 | Takahashi . |
| 4,969,206 | 11/1990 | Desrochers . |
| 4,969,830 | 11/1990 | Daly et al. ........................... 439/928 X |
| 4,998,183 | 3/1991 | Chiang ..................................... 361/686 |
| 5,007,085 | 4/1991 | Greanias et al. . |
| 5,015,831 | 5/1991 | Eastman et al. . |
| 5,031,119 | 7/1991 | Dulaney et al. . |
| 5,059,778 | 10/1991 | Zouzoulas et al. ...................... 235/472 |
| 5,097,388 | 3/1992 | Buist et al. .............................. 361/686 |
| 5,107,253 | 4/1992 | Meadows . |
| 5,110,226 | 5/1992 | Sherman et al. ........................... 400/88 |
| 5,113,445 | 5/1992 | Wang . |
| 5,123,064 | 6/1992 | Hacker et al. ........................... 382/313 |
| 5,130,520 | 7/1992 | Shepard et al. . |
| 5,132,871 | 7/1992 | Densham et al. ........................ 361/685 |
| 5,144,120 | 9/1992 | Krichever et al. . |
| 5,202,817 | 4/1993 | Koenck et al. ........................... 361/680 |
| 5,216,233 | 6/1993 | Main . |
| 5,227,614 | 7/1993 | Danielson et al. . |
| 5,227,617 | 7/1993 | Christopher et al. . |
| 5,235,495 | 8/1993 | Blair et al. . |
| 5,237,161 | 8/1993 | Grodevant . |
| 5,243,655 | 9/1993 | Wang . |
| 5,264,992 | 11/1993 | Hogdahl et al. ......................... 361/681 |
| 5,304,786 | 4/1994 | Pavlidis et al. . |
| 5,321,580 | 6/1994 | Hosoi et al. ............................. 361/684 |
| 5,324,925 | 6/1994 | Koenck et al. . |
| 5,331,136 | 7/1994 | Koenck et al. ........................... 235/375 |
| 5,334,821 | 8/1994 | Campo et al. . |
| 5,337,361 | 8/1994 | Wang et al. . |
| 5,347,115 | 9/1994 | Sherman et al. ......................... 235/472 |
| 5,367,152 | 11/1994 | Krichever et al. . |
| 5,375,076 | 12/1994 | Goodrich et al. . |
| 5,400,055 | 3/1995 | Ma et al. ........................... 364/708.1 X |
| 5,408,077 | 4/1995 | Campo et al. . |
| 5,408,078 | 4/1995 | Campo et al. . |
| 5,541,810 | 7/1996 | Donhauser et al. ..................... 361/686 |

OTHER PUBLICATIONS

Magazine article from *Automatic ID News* entitled, "Pen Based System to the Rescue:Speed fire Inspections and more", p. 21, dated Apr. 1994.

Monicor Electronic Corp. brochure for monicor model IC–100 radio modem entitled, "Monicor Snap–on Radio Modem for Mars Electronics MEQ™ Terminals", undated.

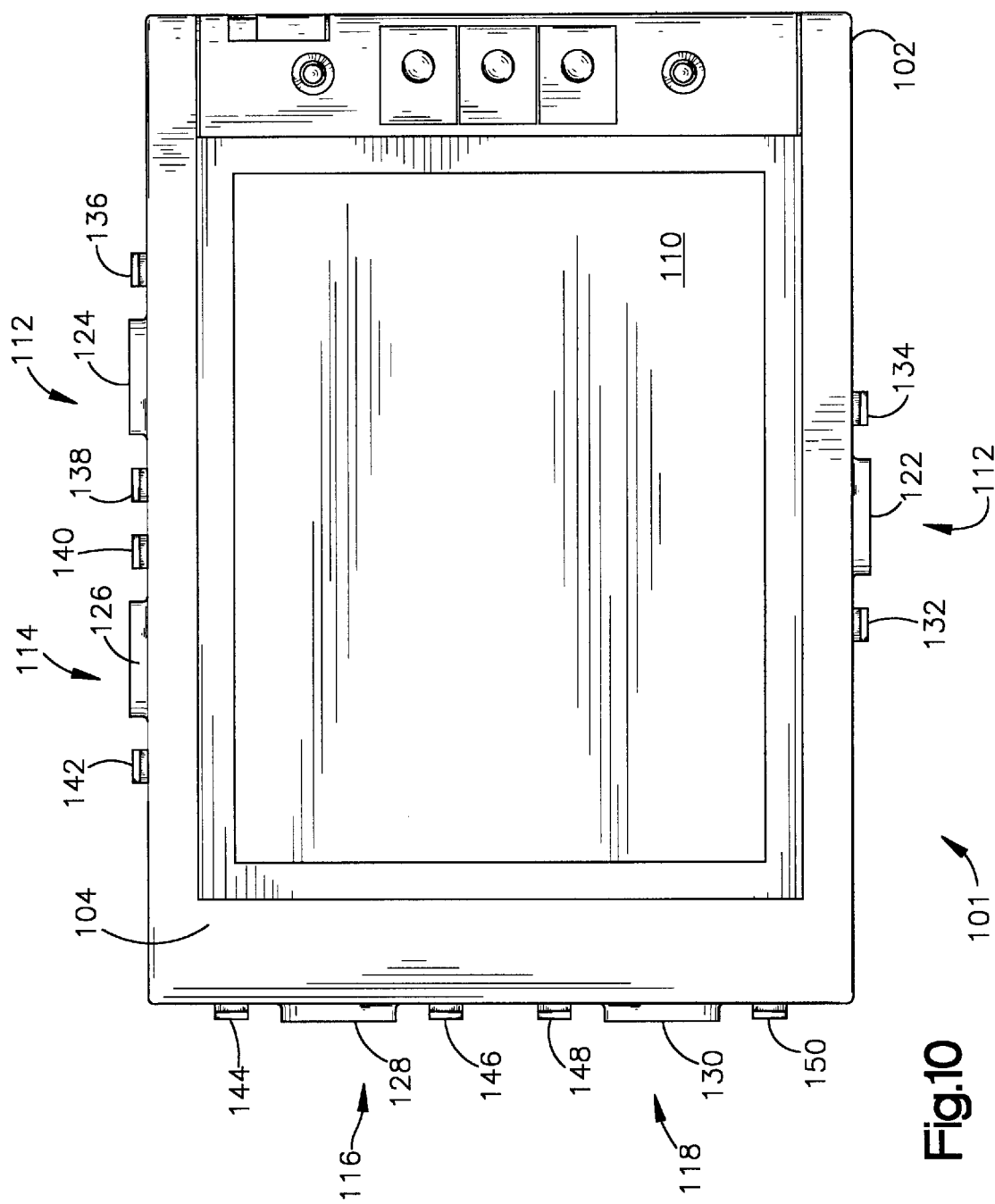

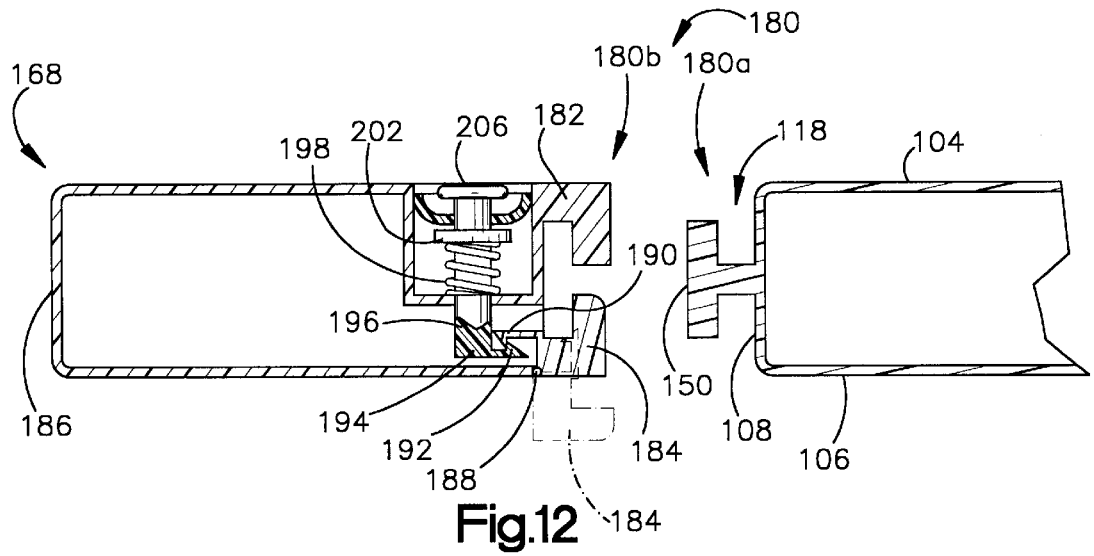
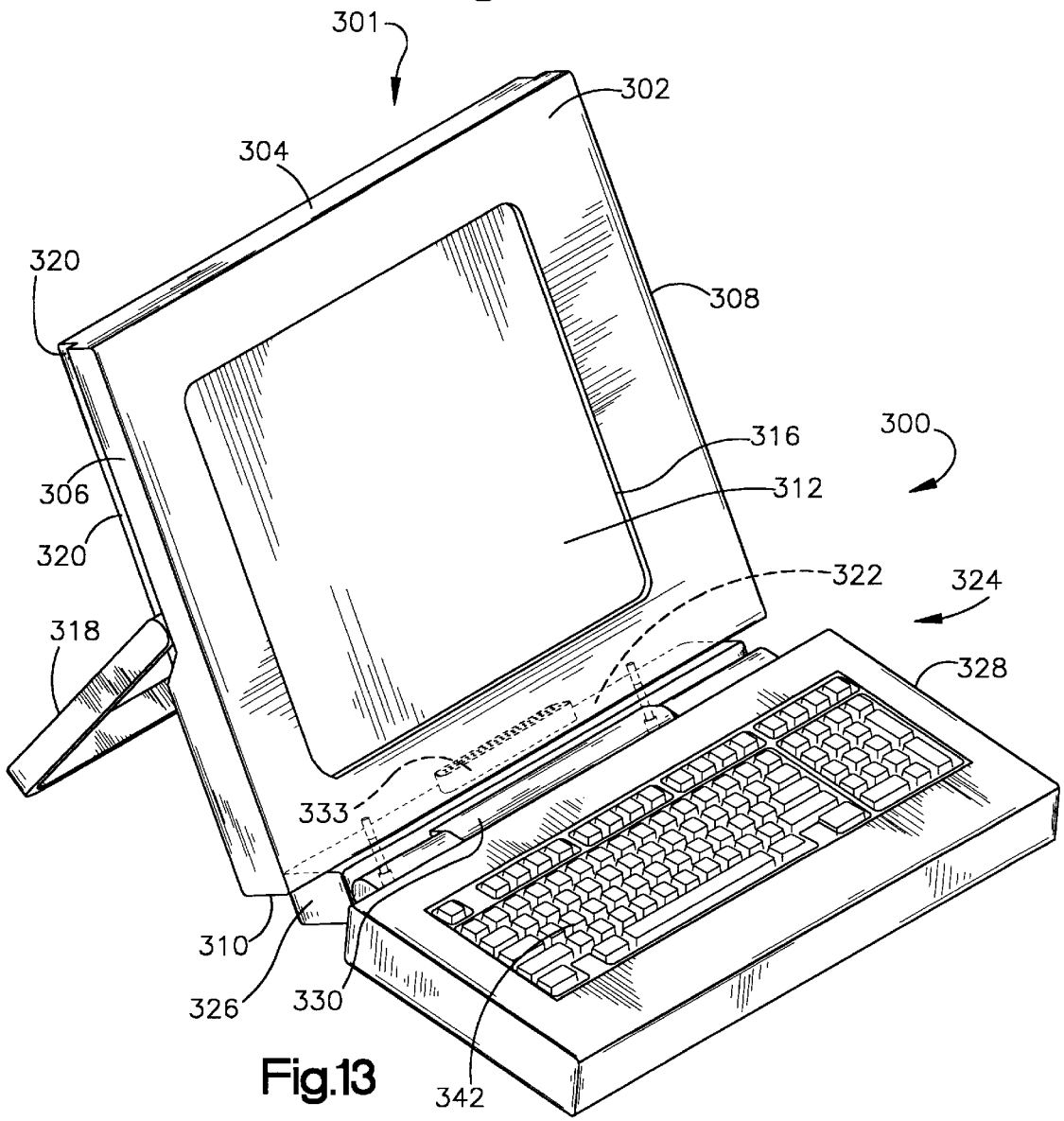

WORKSLATE COMPUTER HAVING MODULAR DEVICE DOCKING STATIONS ON HORIZONTAL AND VERTICAL SIDE PORTIONS

CROSS-REFERENCE TO RELATED APPLICATIONS

The present application is a continuation-in-part of U.S. application Ser. No. 08/269,190 to Meyerson et al. entitled "Configurable Electronic Work Slate Unit," filed Jun. 30, 1994, incorporated herein by reference, now U.S. Pat. No. 5,579,487, which, in turn, is a continuation-in-part of U.S. application Ser. No. 07/956,112 to Meyerson et al., filed Oct. 2, 1992, now abandoned, which is also incorporated herein by reference.

FIELD OF INVENTION

This invention relates to a hand-held portable workslate computer and, more particularly, to a workslate computer including a housing having one or more modular device docking stations and a set of modular devices interchangeably connectable to the housing docking stations.

BACKGROUND ART

The miniaturization of electronic components, the dramatic increase in computing power and reduction in cost of microprocessors as well as the availability of graphical user interfaces have facilitated the development and acceptance of hand-held portable computers. Such hand-held computers are used in a wide variety of applications in both the manufacturing and service sectors of the economy.

A hand-held computer includes one or more interfaces permitting the user to input data, retrieve data stored in memory or accessible from a remote storage device, boot up the operating system, select and run utility programs and/or application programs, enter processing or query commands in response to system prompts and print and/or display output.

Workslate computers are a class of hand-held computers characterized by a relatively large visual display panel or screen supported by an upper face of a relatively thin, rectangular housing. A typical workslate computer housing would be 8"×11" and have a thickness of approximately 1" to 2". The visual display screen would typically be at least 3"×5" and may be as large as 7"×10".

The visual display panel may include a position sensitive contact panel overlying at least a portion of the visual display panel to permit the user to interface with the microprocessor to input data, select screen icons, initiate program execution, etc. The position sensitive contact panel may be either resistive or capacitive. In addition to the visual display panel and position sensitive contact panel, the workslate may also include a rechargeable battery pack, an RF radio, a bar code scanner and a small key pad.

In some workslate computers, an electromagnetic stylus or pen is provided for the user to touch the workslate position sensitive contact panel. The user "marks" on the display screen with the tip of the pen to input data and communicate commands to the microprocessor. A handwriting recognition module may be provided allowing the user to "write" on the panel. In other workslate computers, a touch screen is provided allowing the user to interface with the microprocessor by touching the screen at a selected location, normally in response to system prompts. A graphical user interface displays icons on the touch screen to indicate to the user appropriate touch areas. The contact panel and stylus provides a convenient way to input and output data in an environment where the operator is standing or generally mobile. The operator cradles the workslate in the arm of one hand while entering data with the other hand. This provides workslate computers with an advantage over notebook computers which require that the computer be set on a flat surface for entering data with two hands.

Conventionally, hand-held workslate computers were fabricated with the housing and the electronic components or devices comprising an integral unit, that is, a single integrated housing incorporating all devices and associated electronics. Such an integral design results in a single, permanent configuration for the workslate computer. A fixed configuration limits the flexibility of the workslate computer since a user may want a different "set" of devices than the devices provided on a given workslate computer model. Further, even if a particular workslate computer model includes the interface devices that match the user's initial set of desired interface devices, it is likely that the user's needs will change over the useful life of the workslate computer because the tasks the workslate computer is used for will change, new or improved versions of interface devices become available, etc. Thus, the purchaser of an integral unit workslate computer must purchase a model having all the interface devices he or she contemplates using throughout the working life of the workslate. This increases the cost of the workslate computer as well as the total weight.

Additionally, the fixed configuration of an integral workslate computer requires the manufacturer and/or distributor of the computers to stock a greater number of models to satisfy diverse customer requirements. The greater the number of models, the greater the inventory which must be carried by the manufacturer and/or distributor. This, of course, increases the inventory carrying cost for the manufacturer and/or distributor.

An integral unit workslate computer design also less than optimal from an ergonomic perspective. A workslate computer is normally supported by one hand and corresponding forearm of the user, that is, the hand and forearm "cradle" the workslate such that the visual display panel supported by an upper face of the housing is angled toward the user's head for maximum visibility. The user's other hand is used to touch the position sensitive contact panel to input data and/or on a keyboard, pass a card through a magnetic stripe reader, to press the keys on a keypad, etc.

It is likely that for a given task, not all the interface devices of the workslate computer will be used. Nevertheless, with an integral unit workslate computer, the user must support the weight of the non-utilized interface devices. Since user fatigue increases with increasing weight of any hand-held device, it is not desirable to have a workslate computer "loaded down" with unused interface devices.

Torque forces are exerted on the user's support hand and forearm when the center of gravity of the workslate is not aligned with the user's support axis. The support axis is an imaginary axis which extended longitudinally though the middle of the user's support forearm and hand. There is no provision in an integral unit workslate computer to change or shift the center of gravity by repositioning interface devices on the housing. This problem is magnified by the fact that workslate computers often have rectangular visual display screens and may be used in two different positions; landscape and portrait. In the landscape position, the longer sides of the visual display screen are perpendicular to the user's support forearm; while in the portrait position, the longer sides of the visual display screen are parallel to the user's forearm. Thus, even if the center of gravity of the workslate computer is properly balanced so as to be aligned with the user's support axis in one use position, it may be off-centered with the user's support axis in the other use position.

Torque forces are also exerted on the user's support hand and forearm when the user attempts to apply pressure to portions of the position sensitive contact panel that are not aligned with the user's support hand and forearm. Furthermore, an integral unit workslate computer does not permit changing of interface device positions on the workslate to adapt to left handed versus right handed users. For example, if a keypad is to be used for data entry on a workslate computer, a right handed user would prefer that the keypad be located near the right side of the housing. A left handed user, by comparison, would find it beneficial to have the keypad near the left side of the housing.

The present invention provides a workslate computer with a plurality of peripheral docking stations allowing the user to select and removably attach a desired modular devices to the docking stations. The docking stations have a standard mechanical coupling system and electrical interface, the selected modular interface devices may be attached to the workslate computer in any configuration, that is, at any docking station desired by the user.

DISCLOSURE OF THE INVENTION

An object of the present invention is to provide a hand-held workslate computer with greater user flexibility by offering a user a set of modular devices removably attachable to docking stations disposed about a periphery of a housing.

Another object of this invention is to provide a hand-held workslate computer with docking stations and a set of modular devices which are interchangeable with respect to the docking stations.

Another object of this invention is to provide a hand-held workslate computer with a modular power supply component which is removably attachable to any of the docking stations.

Yet another object of this invention is to enable a user to configure a workslate computer so as to have an ergonomically correct and user comfortable workslate computer given the user's physiological characteristics.

Yet another object of this invention is to provide a modular workslate with a full "QWERTY" keyboard module which can be operated by both of the operator's hand while the workslate is resting on a flat surface. The keyboard module is removable so that the operator does not have to support its weight when holding the workslate in one hand and inputing data through the contact panel with the other hand. When secured to the workslate, the keyboard module has an unfolded position for use in a folded position for easy operator transportation of the workslate.

A hand-held workslate computer made according to this invention comprises a base workslate portion including a housing supporting workslate electronics including a microprocessor and a visual display screen electrically coupled to the microprocessor. The base workslate portion housing includes at least one modular device attachment support or docking station about a periphery of the housing. The modular device docking station is adapted to releasably engage a selected one of a set of modular data processing, input/output, secondary memory and power supply devices. Interface circuitry is provided to electrically couple the selected modular device to the microprocessor.

The modular device docking station is adapted to releasably engage one or more modular devices including a keyboard, a bar code reader, a sensor array camera, a magnetic stripe card reader, a printer, a transceiver, a power supply component, a secondary storage device and a dummy module. The dummy module has no electric circuitry but is attached to an unused docking station to cover and protect the docking station's interface circuitry and the mechanical coupling member or members and to "fill out" the periphery of the housing so that it has a smooth or continuous configuration.

Advantageously, the housing includes a plurality of modular device docking stations spaced about the periphery of the housing. A set of modular devices is selected by the user. The user attaches each selected modular device to a different docking station to achieve a desired configuration.

The workslate computer of the present invention includes docking stations with standardized mechanical coupling system and a standardize electrical interface. The standardized mechanical coupling system and electrical interface provide for interchangeability, that is, any of the modular devices may be attached to any of the docking stations. This permits the user to select a set of modular devices and attach each of the devices to any of the docking stations so as to "customize" the workslate computer to suit the user's task requirements and provide an ergonomically correct weight balance and positioning of the devices.

The workslate computer of the present invention includes electrical interface circuitry to electrically couple the selected modular devices to circuitry in the base workslate portion. The electrical interface between the modular devices and the docking stations may be a conventional terminal pin connection between a modular device and a docking station. Alternately, a ribbon cable having suitable end connectors may be used to electrically couple circuitry in a modular device to circuitry in the base workslate portion. Aligned openings in a housing of the modular device and the base workslate portion housing provide a passageway to route the ribbon cable from the modular device into the base workslate portion housing.

Advantageously, electrical circuitry of each of the modular devices includes a data communications interface controller having a microprocessor to manage data communications between the base workslate portion's I/O communications ports and functional circuitry of the modular device. However, other electrical interface structures are also suitable to electrically couple a modular device to the workslate computer microprocessor. Springed pressure contacts, infrared connections and micro radio data communication are suitable electrical interface alternatives.

The mechanical coupling system includes a threaded connector extending between a modular device and the housing which secures the attachment of the modular device to the housing. A mechanical coupling system featuring a hinged attachment member on each modular device which releasably attaches to a T-shaped member extending from a docking station is an alternative to the threaded connector mechanical coupling system.

Each of the modular device docking stations is adapted to engage not only different types of modular devices, e.g., a keyboard vs. a bar code reader, but also a plurality of devices of the same type. For example, various types of keyboards, an alphabetic keyboard, a numeric/mathematical function keyboard, a keyboard having keys corresponding to commands in a predetermined programming language, etc., may be releasably attached to the same docking station for even greater workslate computer flexibility.

These and other objects, advantages and features of the invention will become better understood from a detailed description of a preferred embodiment which is described in conjunction with the accompanying drawings.

BRIEF DESCRIPTION OF THE DRAWINGS

FIG. 10 is a top plan view of the base portion of the hand-held workslate computer of FIG. 7 with the modular devices removed to better show the housing;

FIG. 12 is an enlarged fragmentary sectional view of a portion of the hand-held workslate of FIG. 7 as seen from a plane indicated by line 12—12 in FIG. 7;

FIG. 13 is a perspective view of another alternate embodiment of the workslate computer of the present invention including a base workslate portion having a modular device docking station adapted to receive a two part modular device including a communications port module and a keyboard module;

DETAILED DESCRIPTION

Figure 1:
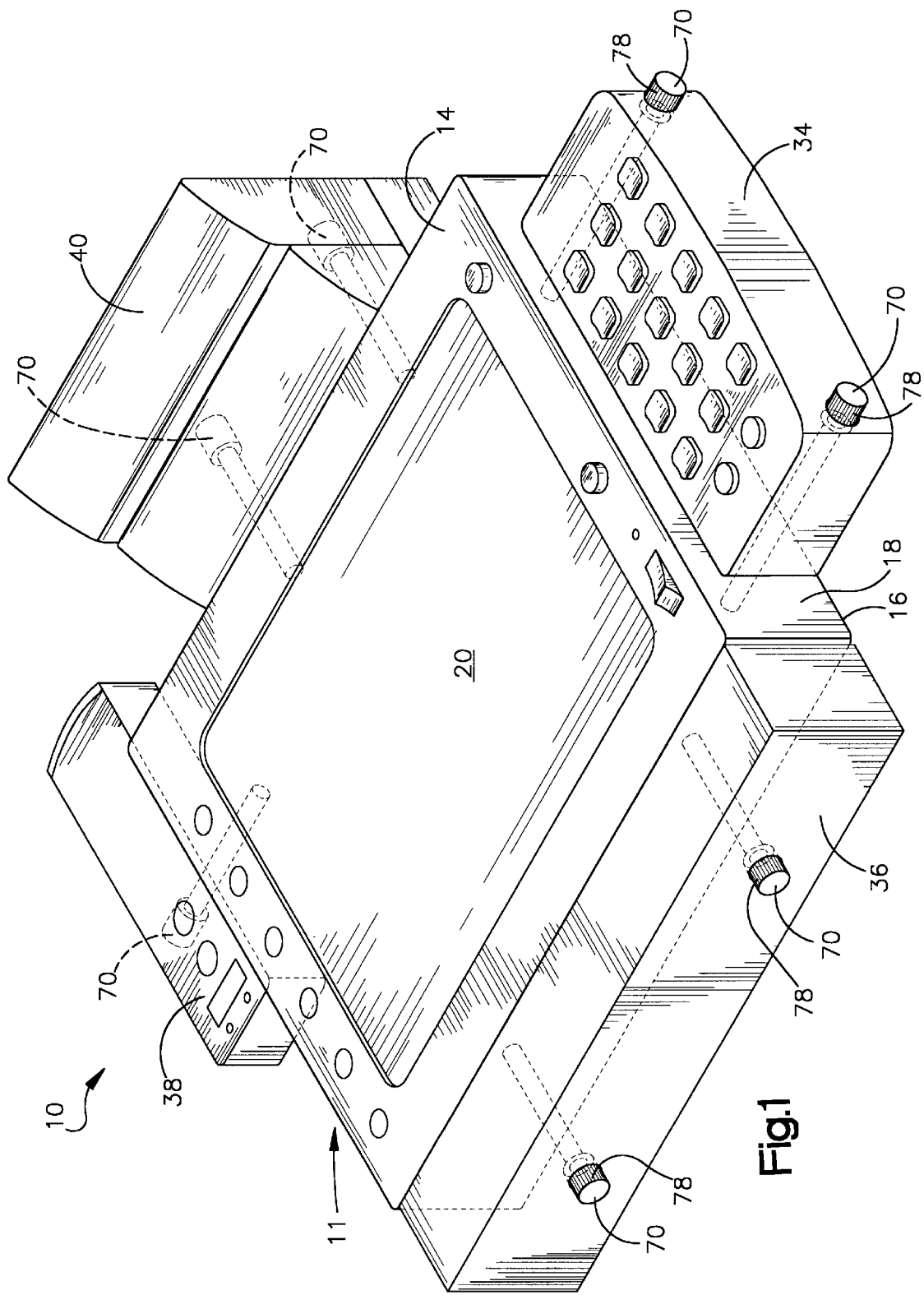
FIG. 1 is a perspective view of a hand-held workslate computer of the present invention including a base workslate portion having a plurality of modular device docking stations and a plurality of modular devices attached to modular device docking stations.

Turning to the drawings, FIG. 1 illustrates one embodiment of a hand-held modularized workslate computer of the present invention, shown generally at 10. The modularized workslate includes a base workslate portion 11. A plurality of modular devices 34, 36, 38, 40 are secured to a periphery of the base workslate 11.

The base workslate 11 includes a housing 12 defining an interior region. The housing 12 includes an upper face 14 and a bottom surface 16 spaced apart by a side wall 18. The side wall 18 defines the thickness of the workslate computer 10 which is substantially less than either a length or a width of the device. As can best be seen in FIG. 2, the upper face 14 and the bottom surface 16 of the housing 12 are generally rectangular. A visual display panel 20 is supported within the housing interior region and is viewed through an aperture in the upper face 14. The aperture through which the visual display panel 20 is viewed is generally rectangular and occupies a substantial portion of the housing upper face 14.

The visual display panel 20 includes an overlying contact sensitive panel with dimensions generally the same as the display panel. The contact sensitive panel permits input of data and/or processing commands by a user.

Figure 7:
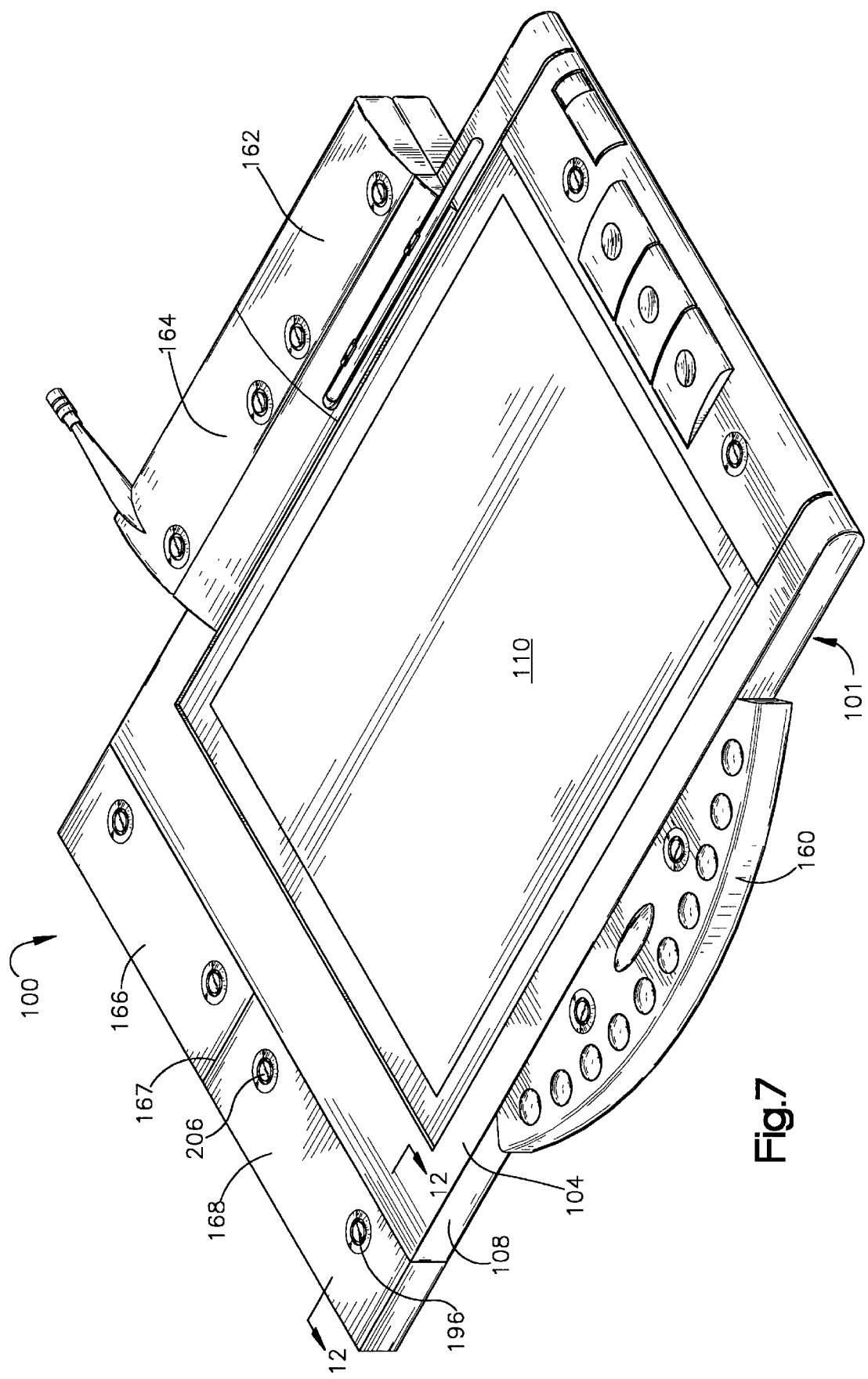
FIG. 7 is a perspective view of an alternate embodiment of the workslate computer of the present invention including a base workslate portion having a plurality of modular device docking stations and a plurality of modular devices attached to the modular device docking stations and further including a hinged mechanical connection structure between the modular devices and the base workslate.
Figure 8:
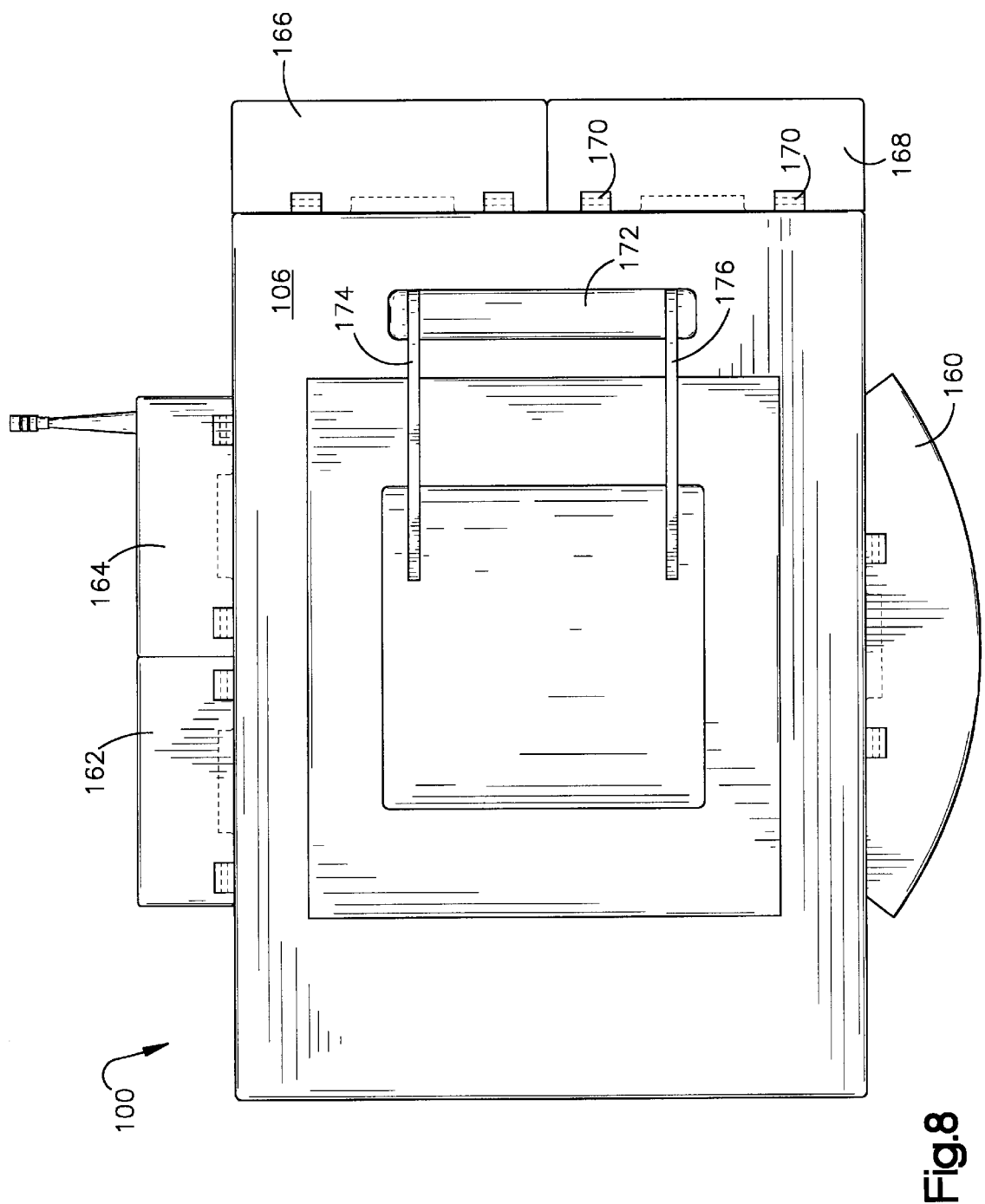
FIG. 8 is a bottom plan view of the hand-held workslate computer of FIG. 7.

As can be seen in FIG. 1, one or more modular devices are secured to the base workslate portion 11. However, it is contemplated that modular devices other than those illustrated may also be selected by an operator (not shown) and interchangeably attached to the base workslate portion 11. It is envisioned that various categories of modular devices would be made available to the operator. One category of modular devices includes devices that receive data from an external source. The magnetic stripe reader 40 and the bar code dataform reader 38, shown in FIG. 1, are typical examples of modular devices in this category. Another category of modular devices includes devices that send data to and receive data from an external source. An RF transceiver (not shown in FIG. 1, but shown in an alternate embodiment of the workslate computer of the present invention illustrated in FIG. 7) is a typical example of a modular device in this category.

Another category of modular devices includes devices that produce an output. Examples of modular devices in this category would include a printer (not shown) or a seven segment display (not shown). Another category of modular devices would be devices that permit a human operator of the workslate computer 10 to input data and/or processing commands. The keyboard 34 or a keypad (shown in FIG. 7) are typical examples. Another category of modular devices would be devices that supply operating power to power circuitry disposed in the base workslate portion 11 and/or other modular devices attached to the base workslate portion. Examples of modular devices in this category include a battery cell modular device 36 (FIG. 1) or a transformer module (not shown) having a cord with a plug connectable to an AC electric outlet (not shown).

A dummy modular device (not shown in FIG. 1, but shown in an alternate embodiment of the workslate computer of the present invention shown in FIG. 7) constitutes yet another category of modular devices. A dummy module is a module without any functional circuitry. Dummy modules are used to protect the mechanical coupling and electrical coupling interfaces of unused docking stations and "fill out" unused docking stations so that the overall configuration of the workslate computer 10 is generally rectangular shaped.

Figure 2:
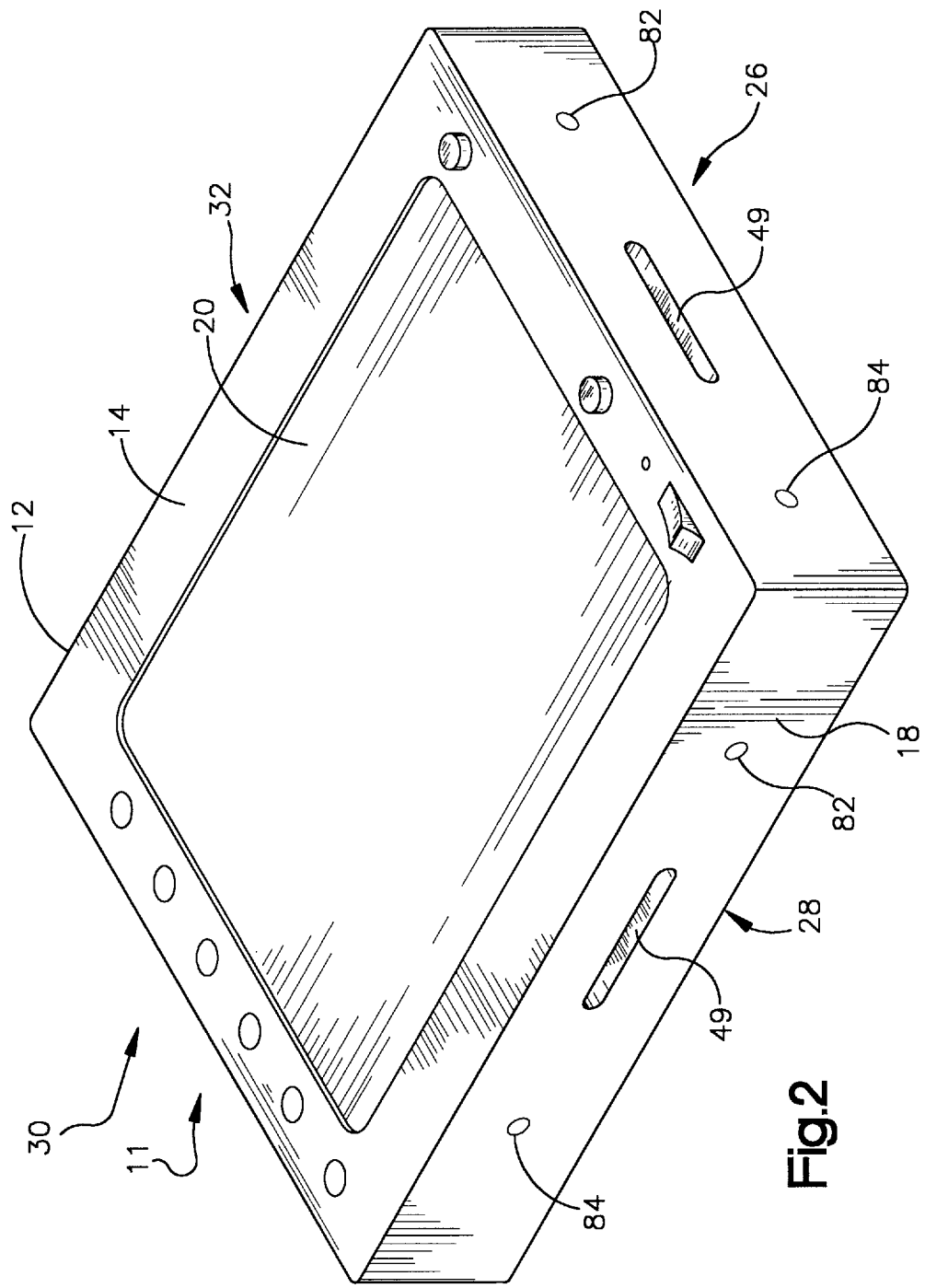
FIG. 2 is a perspective view of the hand-held workslate computer of FIG. 1 with the modular devices removed to better show the base workslate portion.

Turning to FIG. 2, which shows the base workslate portion 11 with the modular devices 34, 36, 38, 40 removed, the side wall 18 of the housing 12 includes four modular device attachment supports or docking stations 26, 28, 30, 32. Returning to FIG. 1, the modular keypad 34 is attached to the modular device docking station 26. The battery cell modular device 36 is attached to the modular device docking station 28. The modular bar code dataform reader 38 is secured to the docking station 30. The modular magnetic strip reader 40 is attached to the modular device support 32. The modular devices, 34, 36, 38 and 40 and the docking stations 26, 28, 30, 32 each have a common mechanical coupling interface such that the modular devices are interchangeable between the modular device docking stations. FIG. 2 shows the base workslate 11 without the modular devices secured thereto. It can be seen from docking stations 26, 28 that each docking station includes two internally threaded bores 82 and 84 in the housing side wall 18 spaced about an aperture 44. The size and threading of the bores and the spacing between the bores is the same for each modular device docking station 26, 28, 30, 32. Therefore, a modular device configured to fit one attachment support or docking station will also fit the others.

As can be seen in FIG. 1, the mechanical coupling interface system for each modular device 34 includes either one or two screws 70, extending through a bore or two bores in the modular device. For example, the keypad module 34 has two throughbores and two screws 70 for attachment to the docking station 26. By contrast, the bar code dataform reader modular device 36 has only one throughbore and one screw 70 for attachment to the docking station 30. The threaded end portions of the screws 70 threadedly engage respective bores 80, 82. The screws 70 have knurled heads 78 providing a positive gripping surface to permit attachment of the modular devices to their selected docking station by finger tightening the screws 70.

Figure 3:
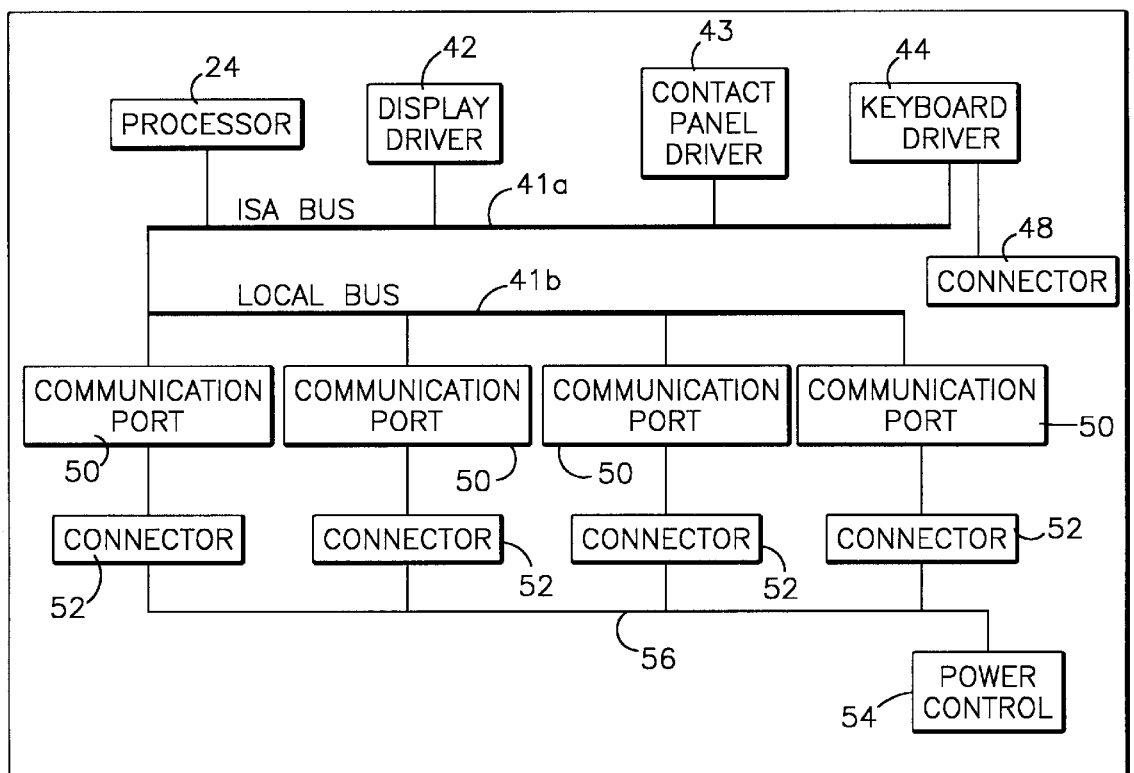
FIG. 3 is a block diagram schematically illustrating electrical circuitry within the base workslate portion of FIG. 1.

A printed circuit board (not shown) is supported within the interior region base workslate portion 11. Electrical circuitry is mounted on the printed circuit board and operates the workslate computer 10. FIG. 3 provides a schematic representation of selected electrical circuitry within the base workslate portion 11. The circuitry includes a processor 24, such as the Intel 80386. The processor 24 supports a local bus 41a and an industry standard architecture (ISA) bus 41b. Display drive circuitry 42, keyboard driver circuitry 44, with an appropriate connector 48, and contact panel driver circuitry 43 are operably connected to the local bus 41a. Connected to the ISA bus 41b are a plurality of communications port circuits 50 with appropriate connectors 52. A power control unit 54 which supplies operating power to the base workslate also includes a power lead 56 attaching to appropriate pins in the communications port connectors 52.

Figures 4, 5:
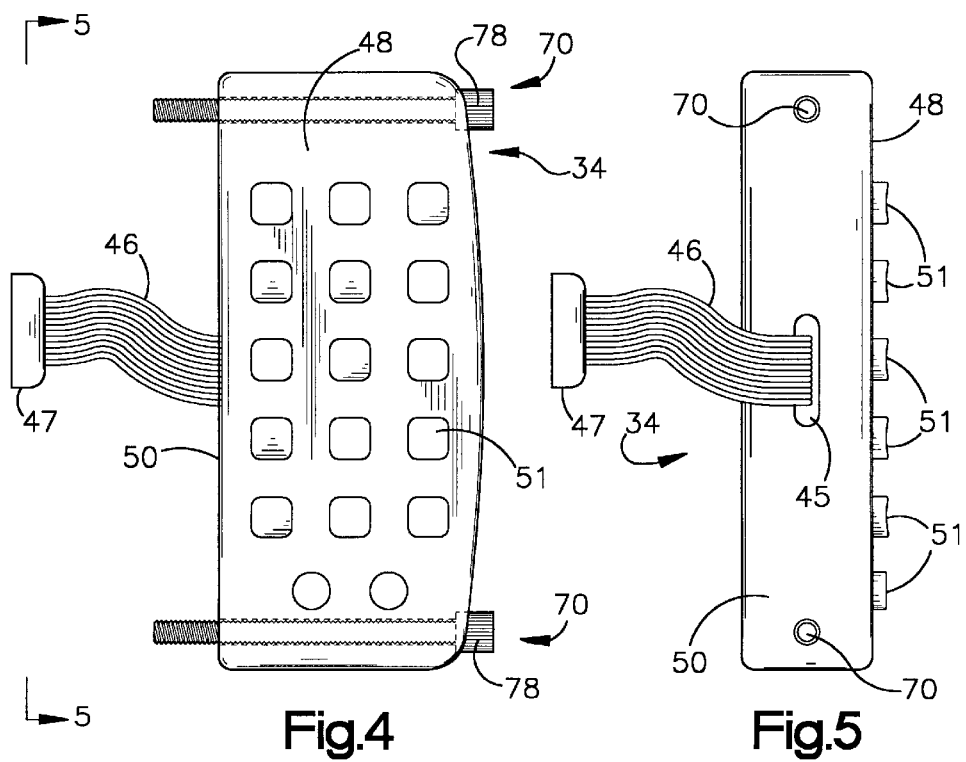
FIG. 4 is a top plan view of the modular keypad device of FIG. 1.
FIG. 5 is a front elevation view of the modular keyboard device of FIG. 1 as seen from a plane indicated by line 5—5 in FIG. 4.

FIGS. 4 and 5 show a front and a side view of the keyboard module 34. The keypad module 34 includes a housing 48, a plurality of manually activated key switches 51 and appropriate circuitry (not shown) for interfacing with the keyboard driver circuitry 44 (FIG. 3). A plurality of conductors in the form of a flexible ribbon cable 46, extends through an aperture 45 in the housing 48. A connector 47, on the end of cable 45 is configured to mate with keyboard connector 48 (FIG. 3). The keyboard connector 48 is a standard female terminal pin receiving connector, for example, a DB25 pin female connector. The ribbon cable connector 47 is a standard male terminal pin connector, a DB25 25 pin male connector. When the keyboard module is secured to the base workslate, the cable 45 passes through an aligned aperture 49 in the base workslate housing side wall 18 (seen in FIG. 2). The connector 47 of the keyboard cable 46 is connected to the keyboard connector 48 on the printed circuit board. The bottom surface 16 of the housing 12 may include an access door which is opened to permit the operator to connect the keyboard cable connector 47 to the printed circuit board—mounted keyboard driver connector 48. Alternatively, the housing 12 may include a removable portion (not shown) to provide operator access to connect the keyboard cable connector 47 to the keyboard driver connector 48. The ribbon cable 45 has an appropriate length to reach the connector 48 from each of the possible modular device attachment supports spaced around the periphery workslate.

Figure 6:
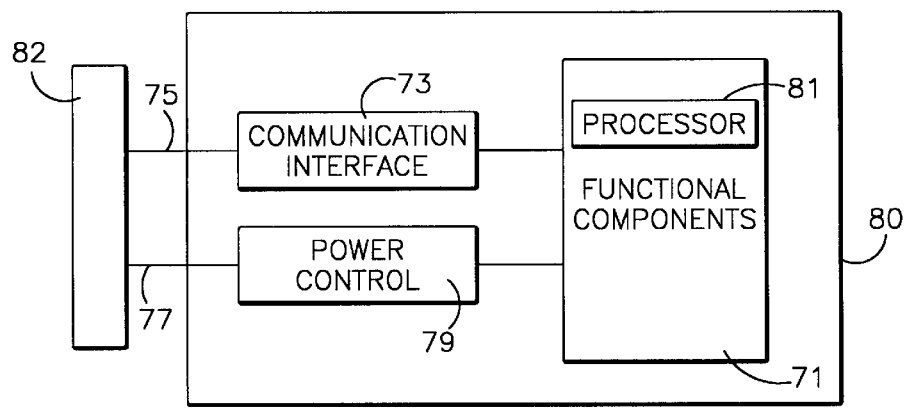
FIG. 6 is a block diagram schematically illustrating electrical circuitry within a modular device.
Figure 9:
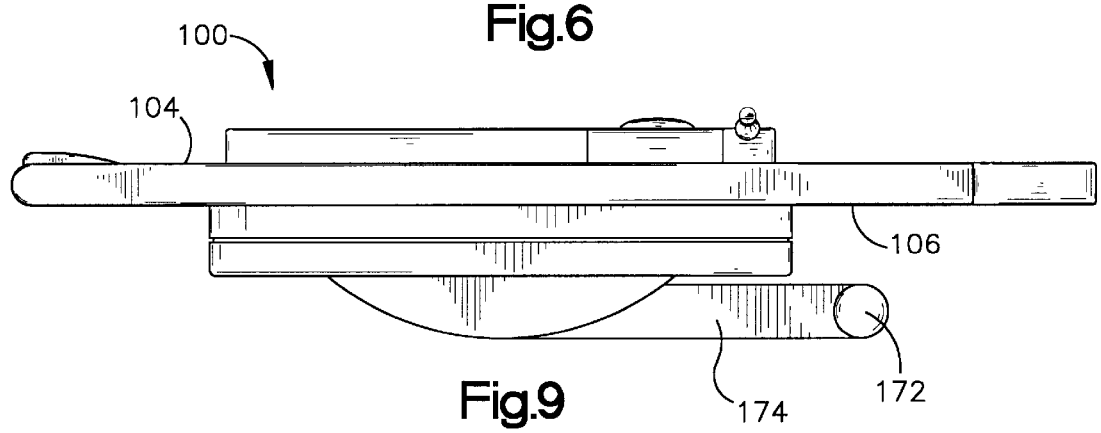
FIG. 9 is a rear elevation view of the hand-held workslate computer of FIG. 7.

Each of the other modular devices, shown in block diagram form in FIG. 6, is designed to be electronically coupled to one of the communications port connectors 52 (schematically shown in FIG. 3).

FIG. 6 schematically illustrates selected circuitry of a representative modular device 80. The device 80 includes functional components 71 to perform data entry, data processing and/or data output functions of the device. For example, if the modular device is a spread spectrum radio transceiver, the functional components 71 may be embodied in a Model 024 spread spectrum radio available from AIRONET Wireless Communication Systems of Akron, Ohio; if the modular device is a laser scanner, the functional components may be embodied in the Model S-E 1000 laser scan engine available from Symbol Technologies, Inc. of Bohemia, N.Y. or the Model 5303 laser scan engine available from PSC, Inc. of Webster, N.Y.; if the modular device is a two dimensional photosensor array reader module, the functional components 71 may be embodied in the extended working range dataform reader disclosed in U.S. patent application Ser. No. 08/507,607 , filed Jul. 25, 1995 and assigned to Metanetics Corporation, the contents of which is hereby incorporated by reference. Because data must be transferred between the functional components and the base workslate processor 24 through a connector 52 coupled to a communications port 50 on the base workslate printed circuit board, the modular device 80 includes communications interface circuitry 73. In modular devices wherein the functional components include an appropriate processor, the communications interface circuitry 73 may be controlled by the processor 81. Alternatively, if the functional components do not include an appropriate processor or it is desired to relieve the processor 81 of data communication responsibility, the communications interface 73 may be embodied in an embedded communications interface controller such as the 80182 Zilog processor.

The modular device 80 includes a plurality of conductors embodied in a flexible ribbon cable 75 with an appropriate connector 82 for securing to a communications port connector 52 on the printed circuit board in the base workslate portion 11. Again, a length of the ribbon cable 75 is sufficient for the modular device to be secured to any of the modular supports about the periphery and have the connector 82 connected to one of the communications port connector 52. The ribbon cable 75 also includes a conductor 77 for communicating power from the power supply leads 56 (FIG. 3) to a power control unit 79 in the modular device. This connection permits the modular device 50 to be powered by the battery cell modular device 36 attached to the base workslate portion 11 rather than requiring an independent power supply.

For the battery cell modular device 36 the functional components circuitry includes a battery pack and the communications interface 73 shown in FIG. 6 is not necessary. The battery cell modular device 36 will supply power to the base workslate portion 11 through the power supply leads 56.

A second embodiment of a workslate computer of the present invention is shown generally at 100 in FIGS. 7–12. The workslate computer 100 comprises a base workslate portion 101 including a durable, lightweight plastic housing 102 (FIG. 10). The housing 102 includes a top surface 104 and a bottom surface 106 (FIG. 8) separated by a side wall 108. The top surface 104 includes an aperture through which a visual display screen 110 supported by the housing 102 is viewed. The visual display screen 110 includes an overlying touch sensitive screen. The housing 102 defines an interior region for supporting workslate computer circuitry (shown schematically in FIG. 11).

As can best be seen in FIG. 10, the workslate computer side wall 108 includes five modular device support attachments or docking stations 112, 114, 116, 118, 120. Each docking station 112, 114, 116, 118, 120 includes a female connector 122, 124, 126, 128, 130 such as a female DB25 twenty-five pin acceptor connector. Each connector extends through and is supported by the side wall 108 of the base workslate portion 101. Each female connector 122, 124, 126, 128, 130 is flanked by two T-shaped members protruding perpendicularly outwardly from the side wall 108. T-shaped member 132, 134 flank connector 122. T-shaped members 136, 138 flank connector 124. T-shaped members 140, 142 flank connector 126. T-shaped members 144, 146 flank connector 128. T-shaped members 148, 150 flank connector 130.

Figure 11:
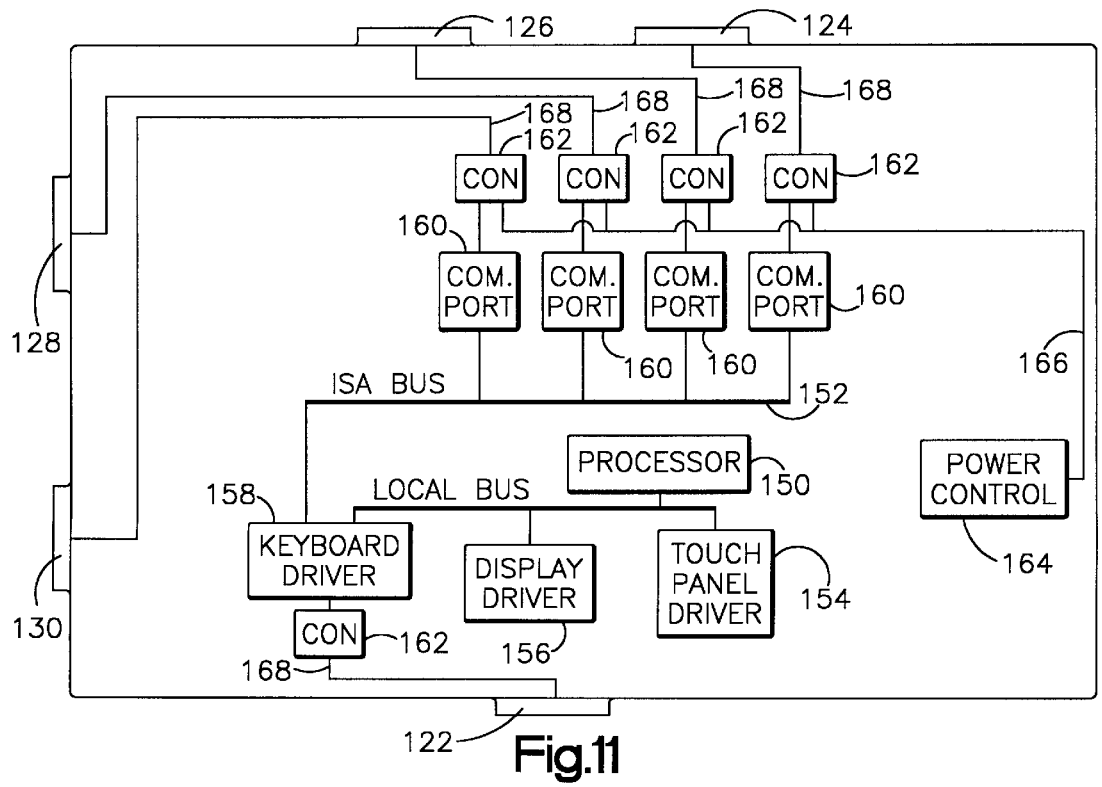
FIG. 11 is a block diagram schematically illustrating electrical circuitry within the base workslate portion of FIG. 7.

FIG. 11 shows a block diagram of the selected electrical circuitry of the base workslate portion 101. Again, a suitable microprocessor 150 controls operation of the workslate electronics including a local bus 153 and an ISA bus 152. Connected to the local bus 153 is touch panel driver circuitry 154, display driver circuitry 156, keyboard driver circuitry 158, and connected to the ISA bus are a plurality of communications ports 160. Associated with each communications port 160 and the keyboard driver circuitry 158 is a connector 162 on the printed circuit board. A power control device 164 on the printed circuit board also includes a lead 166 communicating power between the power control device and each connector 162.

Each of the communications port connectors is connected by a ribbon cable 168 to a corresponding female connector 122, 124, 126, 128, 130 mounted in the side wall 108.

This circuitry enables a modular device to be plug connected to the base workslate at any one of the modular device support attachments 112, 114, 116, 118, 120.

Alternatively, the communications support connectors 121, 123, 125, 127, 129 can be replaced by manually activated DIP (dual in-line package) switches or control logic circuitry for assuring that each modular device is coupled to appropriate circuitry on the main printed circuit board.

While these embodiments are preferred for the electrical interface, it should be understood that other suitable interface structures exist to transfer signals between the modular devices and the base workslate and that such alternate electrical interface structures are within the scope of this invention. Other suitable electrical interface structures would include springed pressure contacts on the docking stations and/or modular devices. Springed pressure contacts extending from, for example, a modular device would contact aligned conductive contact surfaces disposed at the docking station when the modular device is attached to the docking station. The interfacing contact would provide conductive paths between the modular device circuitry and electrical circuitry in the housing 12 coupled to the microprocessor 13. Infrared circuitry, including infrared receptors and transmitters, may be used to transit signals between the modular devices and their corresponding docking stations via infrared waves and power could be transferred through inductive coils. Another appropriate data interface may be provided by providing micro radio transceivers in the modular devices and the workslate computer 12 to transmit RF signals between the modular devices and the microprocessor 13.

Returning to FIG. 7, a keypad module 660 is releasably attached to the attachment member 112. A magnetic stripe reader module 662 is releasably attached to docking station 114. A transceiver module 664 is releasably attached to docking station 116. Releasably attached to docking station 118 is a DC power supply module 666. A dummy module 668, having no electrical circuitry, is attached to docking station 120. With the exception of the dummy module 668, each of the modular devices 660, 662, 664, 666 includes a male connector (not shown) positioned so as to interfit with a respective female connectors 122, 124, 126, 128 when the modular device is attached to its docking station 112, 114, 116, 118 to provide an electrical interface between the modular device's circuitry (not shown) and circuitry (schematically represented in FIG. 11) disposed in the base workslate portion housing 102. A pivotable, rotatable handle 172 is attached to the housing 102 by a pair of handle supports 174, 176. Adjacent modular devices 666, 668 may be mechanically coupled together at a common face 167 to provide for a more rigid workslate periphery.

The mechanical coupling system of the workslate computer 100 will be illustrated by reference to FIG. 12 which shows an enlarged sectional view of a latching mechanism 180, which releasably attaches a modular device in this case, dummy module 168 to the base workslate portion 101. The latching mechanism 180 is a two part mechanism, shown generally at 180a, 180b. FIG. 12 shows the dummy module 168 in cross section separated from its docking station 118. The latching mechanism 180a includes the T-shaped member 150 extending perpendicularly from housing side wall 108. The T-shaped member 150 is captured by two jaws 182, 184 of the latching mechanism 180b. The jaw 182 is fixed with respect to a housing 186 of the dummy module 168 while the jaw 184 is pivotable about a hinge 188. A closed position of the pivoting jaw 184 is shown in solid line in FIG. 14, while an open position of the jaw 184 is shown in dotted line. The pivoting jaw 184 is maintained in the closed by a right angled member 190 extending from a back side of the pivoting jaw which interfits with another right angled member 192 which extends from a distal end 194 of a depressible pin 196.

To release the pivoting jaw 184 from its closed position thereby allowing the dummy module 168 to be attached or detached from the docking station T-shaped member 150, the pin 196 is pressed down with respect to the dummy module housing 186. Depressing the pin 196 a sufficient amount moves the pin right angled member 192 vertically downward far enough so that the member 192 disengages the pivoting jaw right angled member 190 thereby allowing the pivoting jaw 184 to swing to its open position. The pin 196 is biased to its upward position by a spring 198 disposed between a recessed flanged portion 200 of the dummy module housing 186 and an outwardly protruding annular section 202 of the pin. The pin 196 is prevented from being depressed too far by a contoured recessed portion 204 of the dummy module housing 186 which stops the downward travel of a head 206 of the pin. The recessed portion 204 also form a seal with an outer periphery of the pin 196.

To detach a modular device from its docking station, the two pins associated with the device's two locking mechanisms are each depressed thereby releasing the mechanical coupling between the dummy module 168 and the docking station 118. The modular device is then pulled straight out disconnecting the interfitting female and male connectors. (Of course, the dummy module 168 does not have a male connector.)

To attach a modular device to a docking station, the two pins are depressed to open their locking mechanisms' respective pivoting jaws. The modular device is then moved into contact with the docking station such that the male and female connectors engage. For each latching mechanism, the pivoting jaw is then pushed to a closed position, the right angled members of the jaw and pin flexing and snapping into locking engagement to hold the jaw in the closed position thereby securing the modular device to its docking station.

A third embodiment of a workslate computer of the present invention is shown generally at 300 in FIGS. 13–18. The workslate computer 300 includes a base workslate portion 301 having a single docking station 322. A two part module 324 is releasably affixed to the docking station 322. The two part module 324 includes a communications port module portion 326 and a keyboard module portion 328. The communications port module portion 326 is pivotably connected to the keyboard module portion 328 by a hinge 330.

The base workslate portion 301 includes a housing comprising a generally planar top surface 302 and a generally planar bottom surface 303, which is parallel to the top surface 302. The top surface 302 and the bottom surface 303 are separated by a side wall 304. A display screen 312 and a contact panel overlying the screen are accessible through an opening 316 in the top surface 302. The opening 316 is generally rectangular and occupies a substantial portion of the top surface 302. The two part module 324 is mechanically connected to the base workslate portion 301 by two threaded screws 334 (best seen in FIG. 14) which pass through respective parallel throughbores in the communications port module portion 326 and thread into threaded apertures in a face 310 of the side wall 304.

Figure 14:
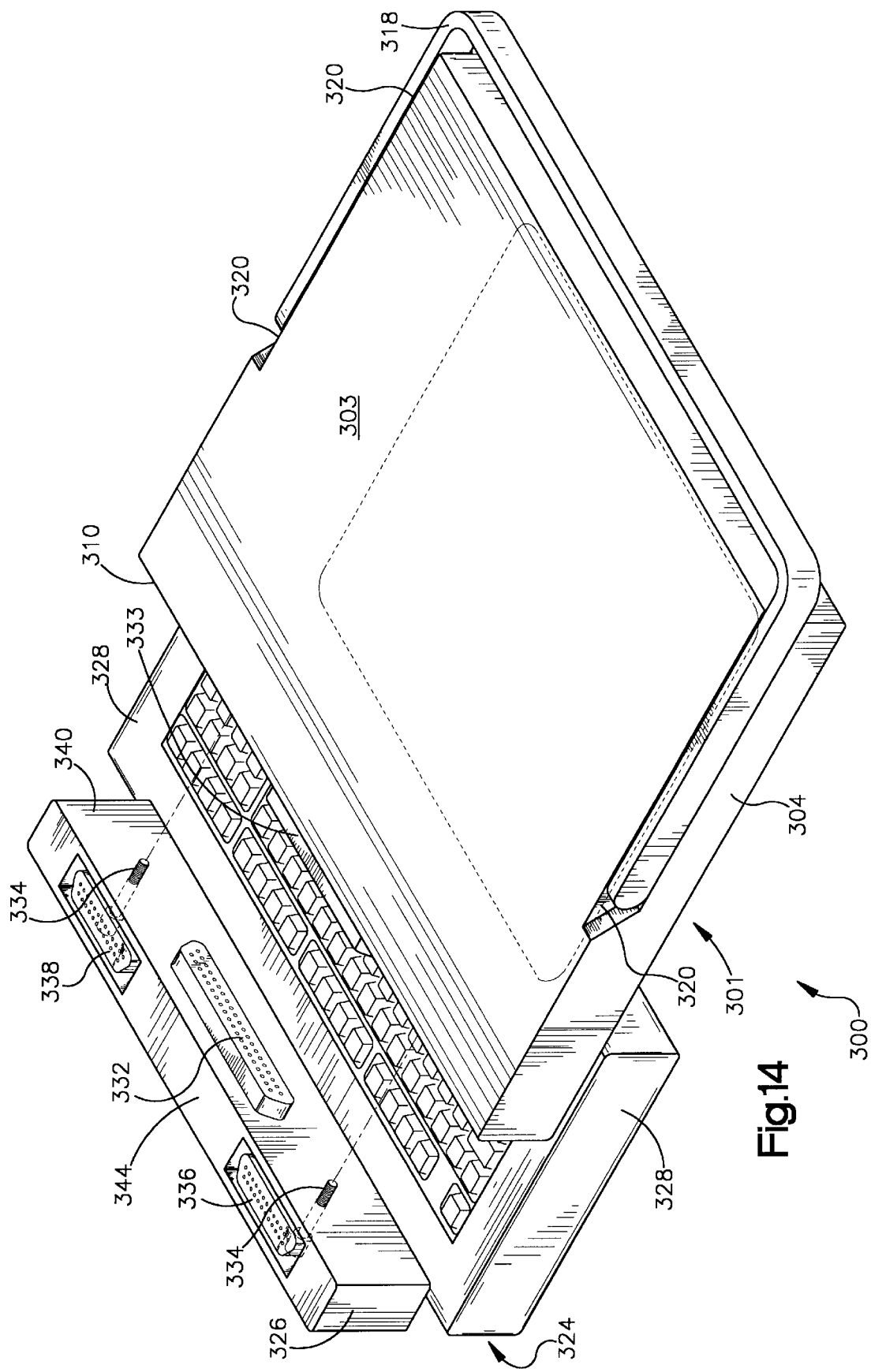
FIG. 14 is a perspective view of the workslate computer of FIG. 13 with the base workslate portion disconnected from the two part modular device.
Figure 15:
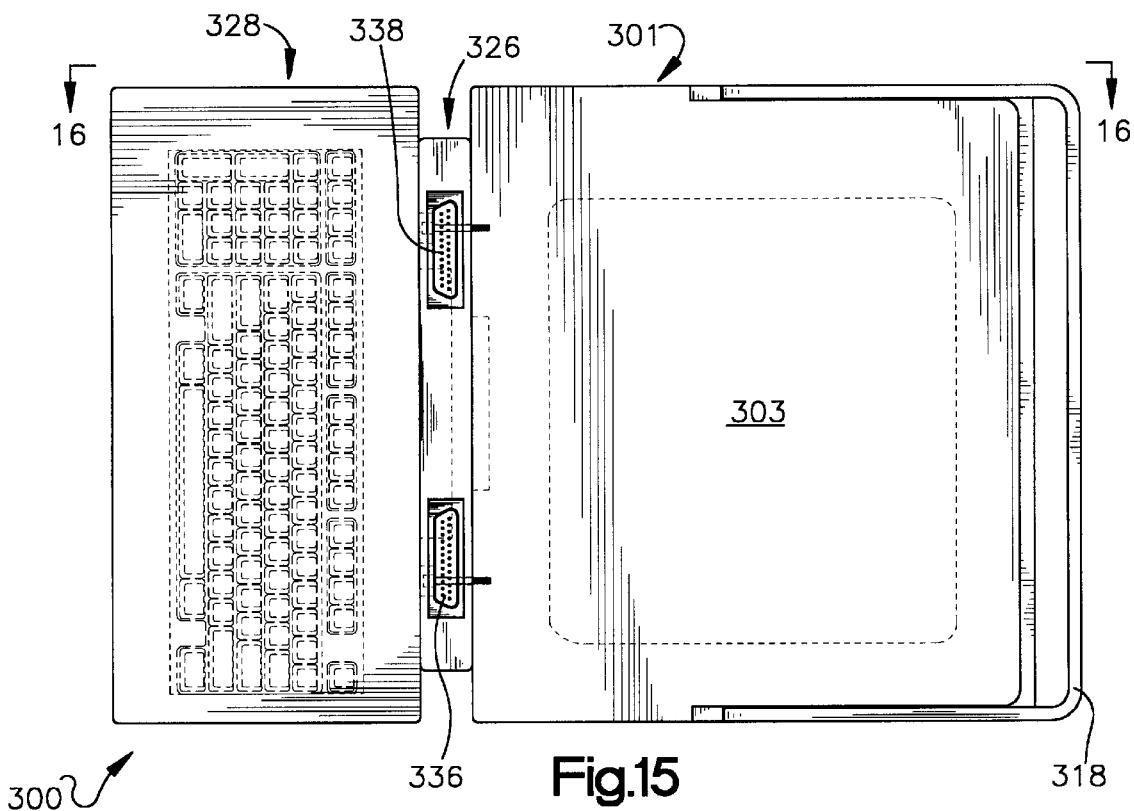
FIG. 15 is a bottom plan view of the workslate computer of FIG. 13.
Figure 16:
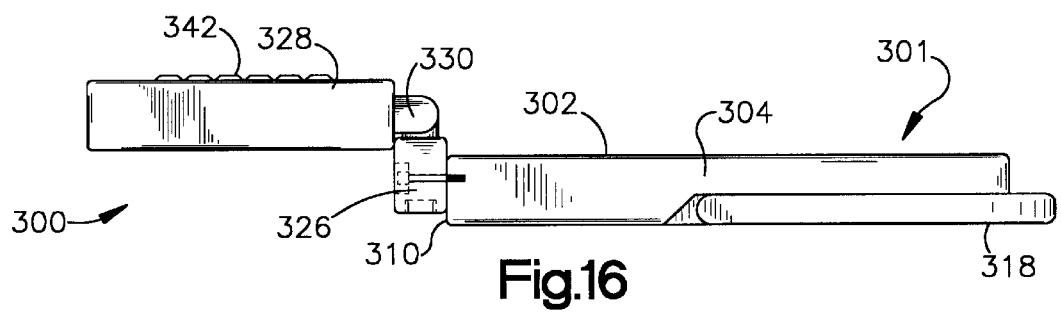
FIG. 16 is a left side elevation view of the workslate computer of FIG. 13.

As can best be seen in FIG. 14, an electrical interface between the two part module 324 and the base workslate portion 301 includes a female terminal connector 332 extending through and supported by a wall 340 of the communications port module portion 326 which interfits with a mating male terminal connector 333 extending through and supported by the side wall face 310. A ribbon cable (not shown) extends through openings (not shown) in the hinge 330 to electrically couple keyboard circuitry with the terminal connector 332.

A handle 318 is pivotably attached to opposite faces 306, 308 of the side wall 304. The handle 318 is pivotable with respect to the base workslate portion 301 and includes a detent latching mechanism (not shown) to secure the handle 318 in a selected one of a plurality of angular orientations with respect to the base workslate portion. The handle 318 may be positioned as shown in FIG. 13 to prop the base workslate portion 301 in an upright position to allow two-handed operation of keyboard 342.

In FIGS. 14–17, the handle 318 is pivoted into recessed regions 320 of the side wall faces 306, 308. In the handle position shown in FIGS. 14–17, the workslate 300 may be ergonomically operated by cradling the workslate in one hand and entering data through the keyboard 342 and/or the contact panel of the display screen 312 with the operator's free hand.

The communications port module portion 326, in addition to supporting the terminal pin connector 332, also includes two additional terminal pin communications port connectors 336, 338. The port connector 336 is a standard parallel port connector, while the port connector 338 is a standard port connector. The port connectors 336, 338 extend through and are support by a wall 344 which is perpendicular to the wall 340 supporting the connector 332. As can best be seen in FIG. 14, the orientation of the port connectors 336, 338 faces away from an operator using the workslate computer 300 with the base workslate portion 301 in a propped up position (as shown in FIG. 13). Therefore, cables connected to the port connectors 336, 338 are behind the workslate and out of the operator's way when the operator is entering data on the keyboard 342 or the contact panel overlying the display screen 312.

Figure 17:
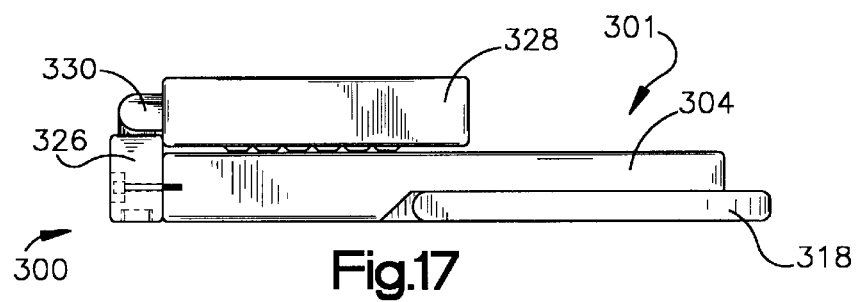
FIG. 17 is a left side elevation view of the workslate of FIG. 13 with the base workslate portion folded over the two part modular device for convenient transport and/or storage.

FIG. 17 shows the workslate computer 300 in a folded position suitable for transport or storage. The keyboard module 328 articulates at the hinge 330 to overlie a portion of the top surface 302 of the base workslate portion 301. The hinge 330 may includes a detent latching mechanism (not shown) to secure the keyboard module 328 in any desired one of a plurality of orientations with respect to the communications port module 326, including the orientations shown in FIGS. 13, 16 and 17. In the folded position (FIG. 17), the workslate computer 300 may be easily carried by the handle 318.

Figure 18:
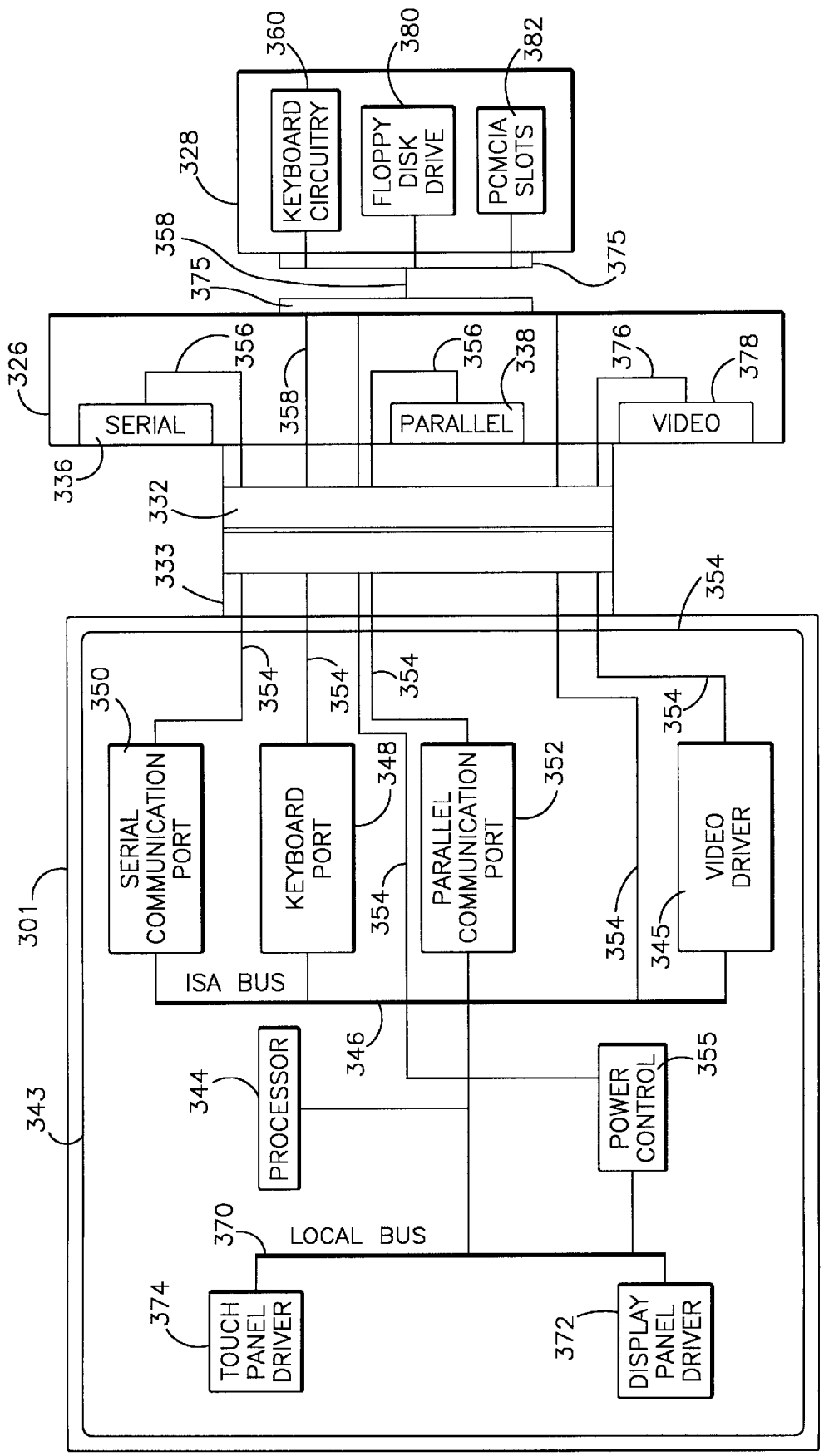
FIG. 18 is a block diagram schematically illustrating electrical circuitry within the base workslate portion and the two part modular device of FIG. 13.

FIG. 18 is a block diagram schematically illustrating electrical circuitry of the workslate computer 300. The base workslate portion 301 includes electrical circuitry 343. The circuitry 343 includes a processor 344 which controls operation of the workslate computer 300 including the display panel 312 and the overlying touch contact panel. The processor 344 supports a local bus 370 and an ISA bus 346. Display panel driver circuitry 372 and touch panel driver circuitry 374 are operably connected to the local bus 370. Connected to the ISA bus 346 are a keyboard communications port 348 and additional communications ports 350, 352 for serial and parallel data communications respectively. Also, an external video driver 345 is operably connected to the ISA bus 346. Power control circuitry 355 supplies power to the circuitry 343 including the processor 344 and the buses 346, 370. Leads 354 associated with the various communications ports 348, 350, 352, the power control 355, the ISA bus 346 and the video driver 345 are connected to terminal pins (not shown) of the docking station connector 333. The power control 355 is connected to a power supply (not shown) and powers the electrical circuitry 343 of the base workslate portion 301 and, through the connector 333, supplies power to circuitry in the communications port module portion 326 and the keyboard module portion 328.

In the communications port module portion 326, leads 356 couple pin receiving contacts of the communications port module portion connector 332 to the serial port connector 336 and the parallel port connector 338. In addition, leads 376 couple the communications port module portion connector 338 to a video port connector 378 associated with the video driver circuitry 345.

Also, the keyboard module portion 338 supports a floppy disk drive 380 and a pair of PCMCIA card slots 382. Connectors 375 at each end of the ribbon cable 358 couple the keyboard circuitry 360, the floppy disk 380 and the PCMCIA card slots 382 to the communication port module portion connector 332.

The present invention has been described with a degree of particularity, it is the intent however, that the invention include all modification and alterations from the disclosed design falling within the spirit or scope of the appended claims.

We claim:

1. A workslate computer comprising:
   a) electronic circuitry including a microprocessor;
   b) a rectangular visual display screen having a horizontal extent and a substantially orthogonal vertical extent, the horizontal extent being greater than the vertical extent, the display screen being electrically coupled to the microprocessor;
   c) a selected one modular device from a set of modular devices;
   d) a housing including a top face and a bottom face separated by a side wall and defining an interior region, the side wall including spaced apart, substantially parallel first and second horizontal side wall portions and spaced apart, substantially parallel first and second vertical side wall portions, the first and second horizontal side wall portions of the side wall being substantially parallel to the horizontal extent of the visual display screen and substantially orthogonal to the first and second vertical side wall portions, the first and second vertical side wall portions being substantially parallel to the vertical extent of the visual display screen, the housing supporting the electronic circuitry and the visual display screen, at least one of the first and second horizontal side wall portions including a first modular device docking station support adapted to be releasably engaged by the selected modular device and at least one of the first and second vertical side wall portions including a second modular device docking station support adapted to be releasably engaged by the selected modular device;
   e) the selected modular device releasably engaging a selected one of the first and second modular device docking station supports to provide an ergonomically correct weight balance of the workslate computer and an ergonomically correct positioning of the selected modular device for a given position of use of the workslate computer by a user; and
   f) interface circuitry electrically supported by the housing and coupling the selected modular device to the microprocessor.

2. The workslate computer of claim 1 wherein the visual display screen has dimensions of at least 3 inches by 5 inches.

3. The workslate computer of claim 1 wherein the set of modular devices includes a keyboard, a keypad, a bar code dataform reader, a sensor array camera, a magnetic stripe reader, a transceiver, a printer, a power supply component and a secondary storage component.

4. The workslate computer of claim 1 wherein the display screen includes a position sensitive contact portion.

5. The workslate computer of claim 1 wherein the modular device is mechanically coupled to the selected one of the first and second modular device docking station supports by a screw which extends through a bore in the selected modular device and screws into a threaded aperture in the selected one of the first and second modular device docking stations.

6. The workslate computer of claim 1 wherein each of the first and second horizontal side wall portions and each of the first and second side wall portions includes a modular device docking station support and a corresponding plurality of modular devices are selected from the set of modular devices, each of the selected modular devices releasably engaging a different selected one of the modular device docking station supports and being interchangeable between the modular device docking station supports.

7. The workslate computer of claim 1 wherein the set of modular devices includes at least one dummy module.

8. A hand-held workslate computer comprising:
   a) a housing defining an interior region;
   b) electronic circuitry including a microprocessor disposed in the housing and a substantially rectangular visual display screen having a vertical length and a substantially orthogonal horizontal length and being supported by a top face of the housing;
   c) a modular device selected from a set of modular devices, the selected modular device including electrical circuitry;
   d) the housing including the top face and a bottom face spaced apart by a front side wall, a back side wall, first and second lateral side walls extending between the front side wall and the back side wall, the front and back side walls being substantially parallel and substantially orthogonal to the first and second lateral side walls, the front and back side walls being substantially parallel to a first axis extending along the horizontal length of the visual display screen and the first and second lateral side walls being substantially parallel to a second axis extending along the vertical length of the visual display screen, at least one of the front and back side walls including a first modular device attachment support adapted to releasably engage the selected modular device and at least one of the first and second lateral side walls including a second modular device attachment support adapted to releasably engage the selected modular device, the housing further supporting interface circuitry to electrically couple the electrical circuitry of the selected modular device to the microprocessor; and
   e) the selected modular device releasably engaging a selected one of the first and second modular device attachment supports to provide an ergonomically correct weight balance of the workslate computer and an ergonomically correct positioning of the selected modular device for a given position of use of the workslate computer by a user.

9. The workslate computer of claim 8 wherein the set of modular devices includes a keyboard, a keypad, a bar code scanner, a sensor array camera, a magnetic card stripe reader, a transceiver, a printer, a power supply component and a secondary storage component.

10. The workslate computer of claim 8 wherein the visual display screen includes a position sensitive contact portion having an overlay which changes resistance when pressure is applied to the overlay.

11. The workslate computer of claim 8 wherein the visual display screen includes a position sensitive contact portion having an overlay which changes capacitance when pressure is applied to the overlay.

12. The workslate computer of claim 8 wherein a mechanical coupling member extends between the selected modular device and the housing to maintain engagement between the selected modular device and the selected one of the first and second modular device attachment supports.

13. The workslate computer of claim 12 wherein the mechanical coupling member is a threaded screw.

14. The workslate computer of claim 8 wherein each of the front and back side walls and each of the first and second lateral side walls includes a modular device attachment support and a corresponding plurality of modular devices are selected from the set of modular devices, each of theselected modular devices engaging a different selected one of the modular device attachment supports.

15. The workslate computer of claim 8 wherein the set of modular devices includes at least one dummy module.

* * * * *